United States Patent
Lee et al.

(10) Patent No.: US 7,194,325 B2
(45) Date of Patent: Mar. 20, 2007

(54) SYSTEM TO AND METHOD OF MONITORING CONDITION OF PROCESS TOOL

(75) Inventors: Seung Jun Lee, Seoul (KR); Seung Yong Doh, Seoul (KR); Chung Hun Park, Hwasung-Si (KR); Yoo Seok Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 11/050,752

(22) Filed: Feb. 7, 2005

(65) Prior Publication Data

US 2005/0256601 A1    Nov. 17, 2005

(30) Foreign Application Priority Data

May 13, 2004    (KR) .................... 10-2004-0033906

(51) Int. Cl.
*G06F 19/00*    (2006.01)
(52) U.S. Cl. ......................................... 700/108; 702/83
(58) Field of Classification Search ........ 700/108–110, 700/121; 702/183–184, 83–84
See application file for complete search history.

(56) References Cited

U.S. PATENT DOCUMENTS 5,859,964 A    1/1999    Wang et al.
6,697,696 B1 *    2/2004    Hickey et al. ............... 700/121
6,718,224 B2 *    4/2004    Firth et al. ................... 700/121
6,763,278 B1 *    7/2004    Coss et al. ................... 700/108
2003/0014145 A1 *    1/2003    Reiss et al. ................. 700/121

FOREIGN PATENT DOCUMENTS

KR    2002-21353    3/2002

* cited by examiner

*Primary Examiner*—Zoila Cabrera
(74) *Attorney, Agent, or Firm*—Stanzione & Kim, LLP (57) ABSTRACT

A system to and method of monitoring a condition of a process tool. The system monitors a condition of a process tool to correctly detect a faulty operation or malfunction of the process tool. The system to monitor the condition of the process tool includes a first model storage unit to store one or more good models generated by data associated with the process tool, a second model storage unit to store one or more faulty models generated by the data associated with the process tool, a model selector to receive tool data from the process tool, and to select one of the good models and one of the faulty models in association with the received tool data, and an error detector to receive process data from the process tool, to compare the received process data with the good and faulty models selected by the model selector, and to estimate a condition of the process tool.

20 Claims, 6 Drawing Sheets

SYSTEM TO AND METHOD OF MONITORING CONDITION OF PROCESS TOOL

CROSS-REFERENCE TO RELATED APPLICATIONS

This application claims the benefit of Korean Patent Application No. 2004-33906, filed May 13, 2004, in the Korean Intellectual Property Office, the disclosure of which is incorporated herein by reference.

BACKGROUND OF THE INVENTION

1. Field of the Invention

The present general inventive concept relates to a system to and method of monitoring a condition of a process tool, and more particularly, to a system to and method of monitoring a condition of a process tool capable of detecting a malfunction or faulty operation of the process tool.

2. Description of the Related Art

Generally, a semiconductor is manufactured by a variety of processes, for example, diffusion-processes, photo-processes, etching-processes, etc. Each process fabricates a wafer using a variety of tools.

The wafer is typically manufactured by moving along a production line. Quality and productivity of the semiconductor are largely affected by a condition of a tool currently fabricating the wafer. If consecutive processes are performed even though errors or malfunctions occur with a semiconductor fabrication device, a production yield is deteriorated and production costs are increased. Therefore, there are proposed a variety of methods for quickly detecting malfunctions or faulty operations of the wafer fabrication device.

An APC (Advanced Process Control) system is indicative of a representative system for monitoring conditions of the wafer fabrication device. Particularly, an FDC (Fault Detection and Classification) system among a variety of APC systems has been widely adapted to monitor the conditions of the wafer fabrication device.

The FDC system receives various process data (e.g., temperature, pressure, and power, etc.) from a communication port or an additional data collector to detect a faulty operation or malfunction of the wafer fabrication device. In this case, the process data is indicative of various stimuli applied to equipment capable of performing a variety of processes for manufacturing the wafer. Upon receipt of the process data, the FDC system compares the received process data with a reference model generated by reference data, such that it can determine a current condition of the wafer fabrication device.

If a faulty operation or malfunction of the wafer fabrication device occurs in the aforementioned monitoring process, the FDC system warns of a problem of the wafer fabrication device or stops operating the production line of the wafer. For example, if the FDC system continuously receiving process data associated with a flow rate of argon (Ar) gas determines that a difference between the flow rate of Ar gas and a reference flow rate is larger than a predetermined error range, it determines that an unexpected error or faulty operation occurs in the process during which the Ar gas is used, such that it generates an alarm signal or sound. Another method for detecting such a faulty operation or malfunction of the semiconductor fabrication device using the APC system has been disclosed in Korean Patent Laid-open Publication No. 2003-0019635.

However, the aforementioned conventional device for monitoring conditions of the semiconductor fabrication device using the APC system does not consider typical faulty data, whereas it samples typical good data and adapts only the sampled good data as reference data, such that it has a disadvantage in that it is unable to correctly estimate current conditions of the semiconductor fabrication device. In more detail, although data may include faulty process data, the aforementioned conventional device wrongly determines that the data is similar to a reference model extracted from good data in such a way that it mistakes the faulty process data for good process data. Furthermore, the aforementioned conventional device mistakes a normal condition of the semiconductor fabrication device for an abnormal condition of the same, such that it stops operating the semiconductor fabrication device, resulting in deterioration of production efficiency.

SUMMARY OF THE INVENTION

Accordingly, it is an aspect of the present general inventive concept to provide a system to and method of monitoring a condition of a process tool to correctly detect a faulty operation or malfunction of the process tool.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a system to monitor a condition of a process tool comprising: a first model storage unit to store one or more good models generated by data associated with the process tool; a second model storage unit to store one or more faulty models generated by the data; a model selector to receive tool data from the process tool, and select one of the good models and one of the faulty models in association with the received tool data; and an error detector to receive process data from the process tool, to compare the received process data with the good and faulty models selected by the model selector, and to estimate a condition of the process tool.

The foregoing and/or other aspects and advantages of the present general inventive concept are also achieved by providing a system to monitor a condition of a process tool comprising: a model storage unit to store at least one good model indicative of reference good data for determining a condition of a process tool and at least one faulty model indicative of reference faulty data for determining a condition of the process tool; a model selector to receive tool data from the process tool, and to select the good model and the faulty model in association with the received tool data; and an error detector to receive process data from the process tool, to compare the received process data with the good and faulty models selected by the model selector, and to estimate a condition of the process tool.

The foregoing and/or other aspects and advantages of the present general inventive concept are also achieved by providing a method of monitoring a condition of a process tool, comprising the operations of: storing one or more good models generated by good data collected in a normal condition of a process tool and one or more good models generated by faulty data collected in an abnormal condition of the process tool; selecting a good model and a faulty model in association with tool data received from the process tool; comparing the process data received from the process tool with the selected good model and the selected faulty model; and determining a condition of the process tool according to the result of the comparison.

BRIEF DESCRIPTION OF THE DRAWINGS

These and/or other aspects and advantages of the present general inventive concept will become apparent and more readily appreciated from the following description of the embodiments, taken in conjunction with the accompanying drawings in which.

DETAILED DESCRIPTION OF THE PREFERRED EMBODIMENTS

Reference will now be made in detail with respect to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
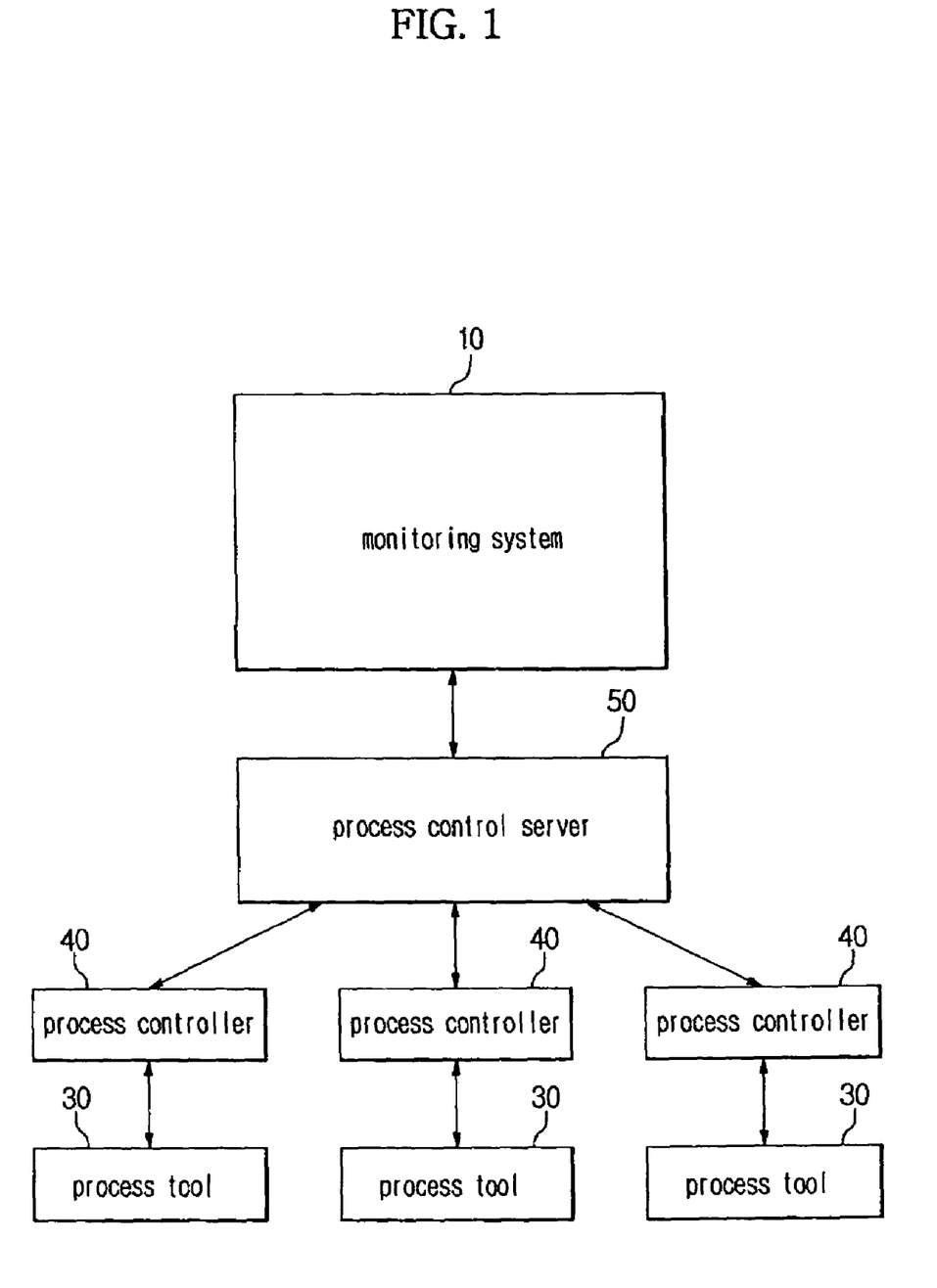
FIG. 1 is a block diagram illustrating a production line for use in a monitoring system in accordance with an embodiment of the present general inventive concept.

As shown in FIG. 1, a semiconductor fabrication device to be used with a monitoring system 10 in accordance with an embodiment the present general inventive concept comprises a plurality of process tools 30, a plurality of process controllers 40 to respectively control the process tools 30, and a process control server 50 to control overall operations of the device.

The plurality of process tools 30 are indicative of individual tools use to fabricate a wafer in a semiconductor fabrication process, and are equipped with sensors (not shown) to detect conditions of the process tools 30.

The plurality of process controllers 40 each receives a control command from the process control server 50, such that they control the movement of the respective process tools 30.

The process control server 50 controls the fabrication device, receives process data from the process tools 30, and transmits the received process data to the monitoring system 10.

Figure 2:
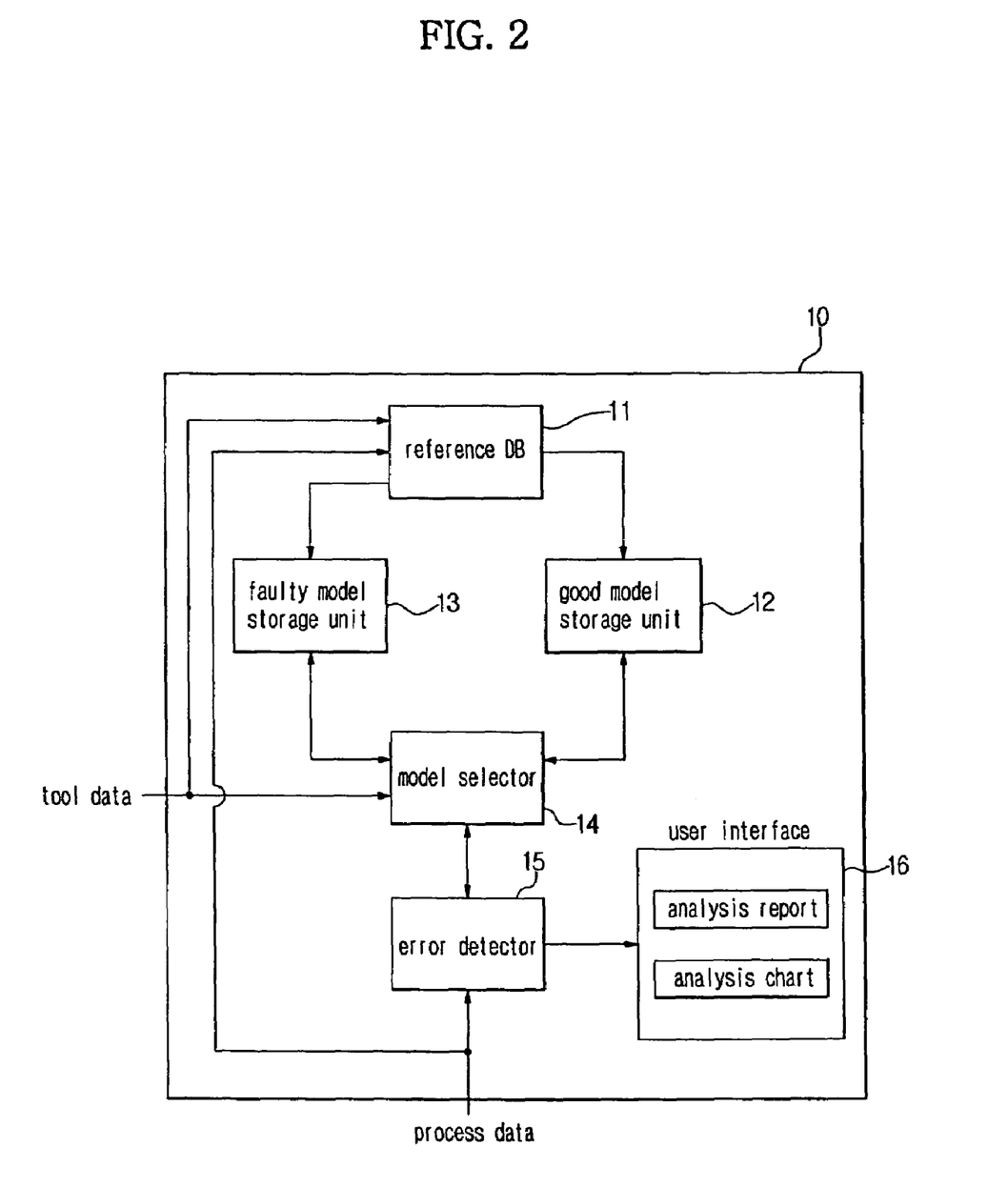
FIG. 2 is a block diagram illustrating a monitoring system in accordance with an embodiment of the present general inventive concept.

As shown in FIG. 2, the monitoring system 10 of FIG. 1 comprises a reference DB (DataBase) 11 to store typical good and faulty data and various data associated with operations of the process tools 30, a good model storage unit 12 to store a plurality of good models generated by the typical good data, a faulty model storage unit 13 to store a plurality of faulty models generated by the typical faulty data, a model selector 14 to select good and faulty models in consideration of tool data received from the process control server 50, and an error detector 15 to compare the process data with the selected good and faulty models to determine a condition of the process tools.

The reference DB 11 receives the various operation data including process data and tool data from the process control server 50, such that it distinguishes between the good data and the faulty data. In this case, the good data is indicative of data generated during fabrication of a good wafer. The good wafer is distinguished from a faulty wafer on the basis of a variety of references. For example, if the number of faulty dies in a specific wafer is the same or less than a predetermined number, the specific wafer is determined to be a good wafer. If the number of faulty dies in a specific wafer is the same or higher than another predetermined number, the specific wafer is determined to be a faulty wafer.

The good model is indicative of reference data modeled by the good data and its associated estimation method. In more detail, the good model includes reference data selected by a model generation method of the good data and its associated estimation method. In this case, the estimation method is one of a variety of estimation algorithms, and is carried out when the error detector performs a specific estimation algorithm contained in the model.

The method of modeling the good data may be determined to be either a PCA (Principal Component Analysis) technique or a UPM (Universal Process Model) developed by, for example, Triant Technologies Corporation, etc. The PCA technique collects process data in real time, performs modeling of the collected process data, and detects an error or faulty operation. The PCA technique is provided in a detailed description disclosed in "Principal Component Analysis", Spring-Verlag, 1986. The UPM has been disclosed in the prior art section of Korean Patent Laid-open Publication No. 2002-0021353.

Figure 3:
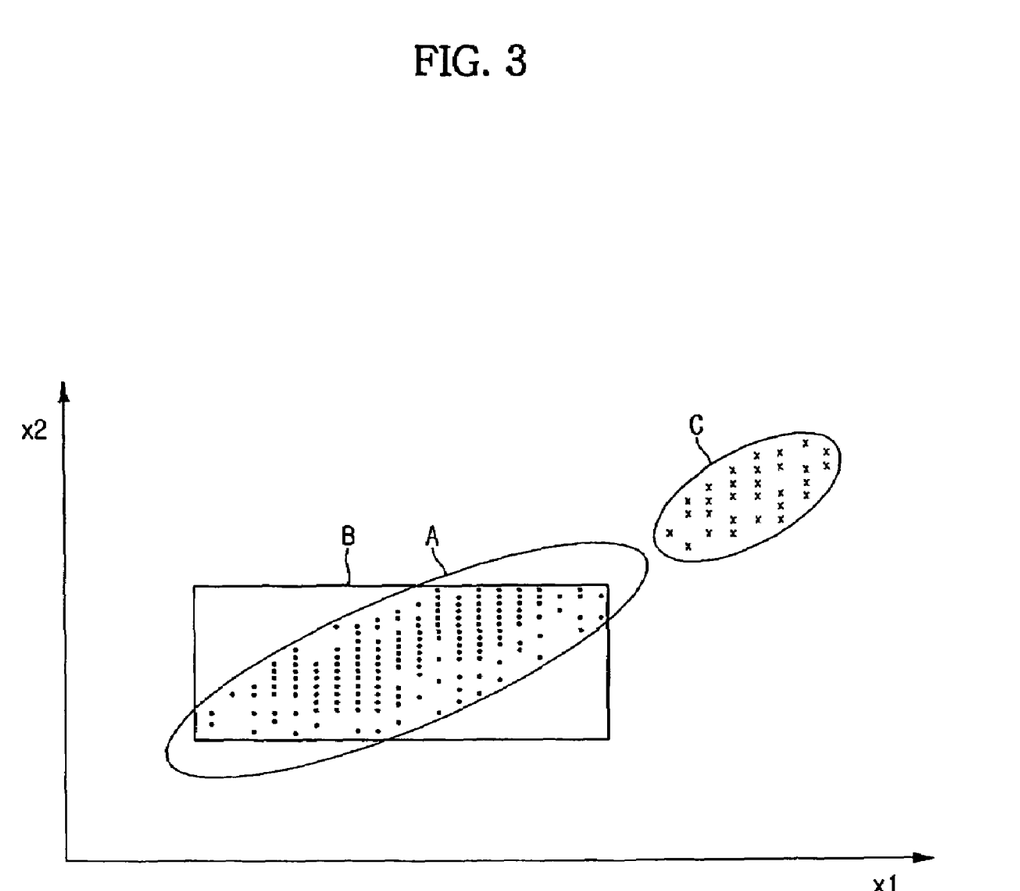
FIG. 3 is a diagram illustrating an exemplary model generated by the monitoring system of FIG. 2, in accordance with an embodiment of the present general inventive concept.

The good data and the good model will hereinafter be described with reference to FIG. 3. In FIG. 3, an X-axis is indicative of a parameter x1, and a Y-axis is indicative of a parameter x2. In this case, the parameters x1 and x2 may be determined to be predetermined values from among process data, respectively. In FIG. 3, dots are indicative of good data, X characters are indicative of faulty data, a character 'A' is indicative of a good model generated by a multivariation-modeling process, a character 'B' is indicative of a good model generated by a univariation-modeling process, and a character 'C' is indicative of a faulty model.

The good model may be differently determined by a variety of modeling methods. For example, as can be seen from FIG. 3, the good model may be modeled by multi-variations in the same manner as in the group 'A', or may also be modeled by a univariation in the same manner as in the group 'B'. The PCA technique models such a good model using parameters y1 and y2 as denoted by y1=x1+x2 and y2=x1−x2, such that a single good model is formed (not shown in FIG. 3). Otherwise, another good model may be modeled in the form of bi-variation normal distribution using parameters x1 and x2 (not shown in FIG. 3). As can be seen from the A and B groups in FIG. 3, the good model generally includes all of good data, but its total range may be differently determined.

In contrast with the good model, the faulty model is indicative of reference data modeled by faulty data and its associated estimation method, and includes reference data modeled by the faulty data and its associated estimation method. In more detail, the good model includes reference data selected by a model generation method of the good data and its associated estimation method. In this case, the estimation method is one of a variety of estimation algorithms, and is carried out when the error detector performs a specific estimation algorithm contained in the model in the same manner as in the good model.

The faulty data is indicative of data collected when process tools have been in an abnormal condition in previous semiconductor fabrication processes. The method of modeling the faulty model in the faulty data may be equal to the method of modeling the good model. Although only one faulty model has been depicted in FIG. 3, it should be noted that the faulty model can differently determine its overall area according to a modeling method.

The model selector 14 stores a predetermined table including good and faulty models to be selected in response to entry tool data. In this case, the process tool data is indicative of a variety of information affecting process tool performance, for example, a degree of obsolescence of any process tool, the presence or absence of replacement of a component in the process tool, the presence or absence of a process change, etc. For example, the model selector 14 stores a specific table, which performs a modeling process using the PCA technique when the process tool has been driven during a period of about one year, or performs a modeling process using the UPM technique when the process tool has been driven during a period of about five years. The model selector 14 receives various process tool data, and selects the most appropriate model for current tool conditions with reference to the table.

The error detector 15 compares process data received from the process control server 50 with the good model and the faulty model selected by the model selector 14, such that it can estimate a current condition of the process tool. The algorithm to estimate such a condition of the process tool may be determined to be a Hotelling's T-square test, a neural network method widely used in statistical analysis fields, a user-defined estimation method, etc. Also, similarity to a comparison-reference model in response to the used estimation method may be denoted by, for example, a percentage value, a statistical calibration value, etc. The aforementioned estimation algorithm is simultaneously established when models stored in the good model storage unit 12 and the faulty model storage unit 13 are established, so that the estimation algorithm is also stored in the good and faulty model storage units 12 and 13.

Therefore, the error detector 15 estimates the received process data and good model using a predetermined estimation method, re-estimates the same process data and good model using the same method, and combines the two estimation results, such that it obtains the final estimation result.

There are two methods of combining the two estimation results, i.e., a first method of selecting one result of greater similarity between the two estimation results, and a second method of applying a weight to each of the two estimation results and selecting the result of higher similarity between the two estimation results. For example, after the result of comparison between the entry process data and the good model, if the entry process data is similar to the good model by 90% while it is similar to the faulty model by 10%, it is determined that the process data is more similar to the good model, such that a corresponding case associated with the process data is determined to be a normal case.

Also, in the case of the aforementioned example, a weight $\alpha$ is applied to similarity between the process data and the good model, the other weight $\beta$ is applied to similarity between the process data and the faulty model, and the $\alpha$-weighted similarity between the process data and the good model and the $\beta$-weighted similarity between the process data and the faulty model are re-calculated, such that the result of the greater similarity may also be selected.

Figure 4:
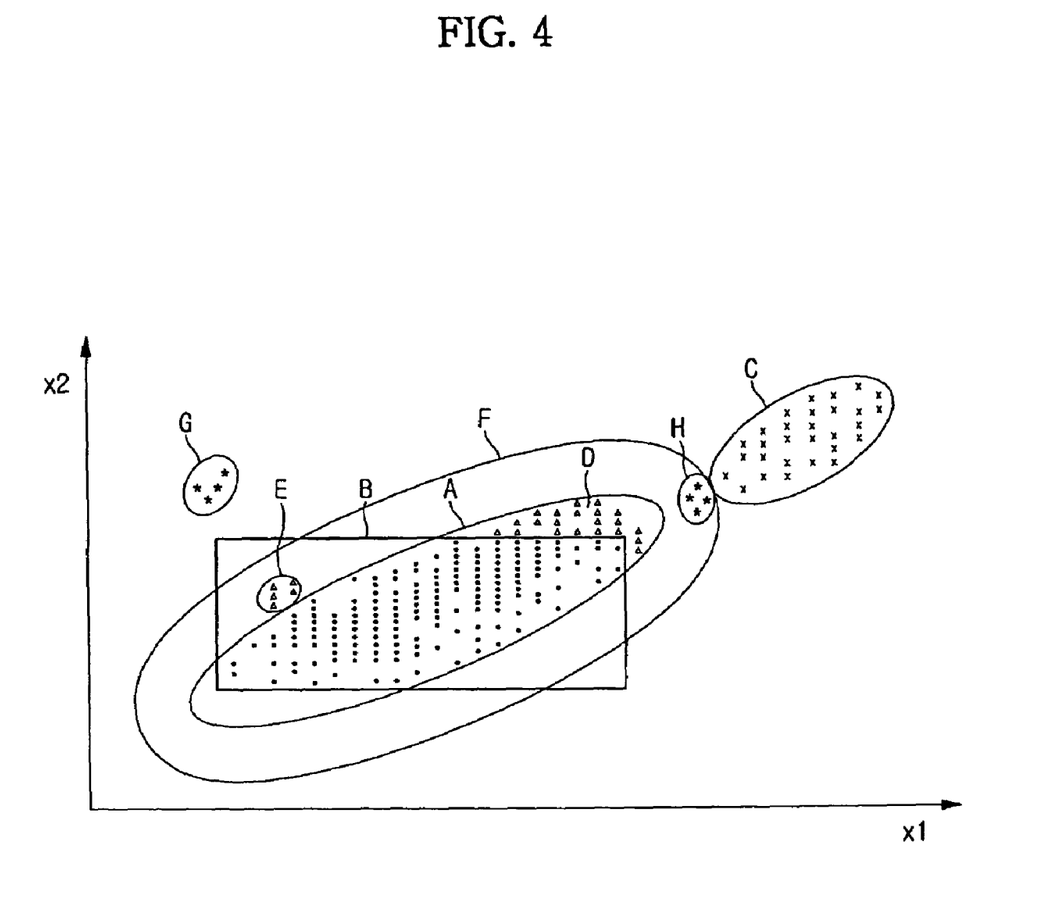
FIG. 4 is a diagram illustrating a method of estimating conditions of process tools in the monitoring system of FIG. 2, in accordance with an embodiment of the present general inventive concept.

In FIG. 4, an X-axis is indicative of a parameter x1, a Y-axis is indicative of a parameter x2, dots are indicative of good data, X characters are indicative of faulty data, a character 'A' is indicative of a good model generated by a multivariation-modeling process, a character 'B' is indicative of a good model generated by a univariation-modeling process, a character 'C' is indicative of a faulty model, and a character 'D' is indicative of process data, which is determined to be normal data when the A character is indicative of a reference model, and determines the normal or abnormal condition of the process tool on the basis of similarity to the good and faulty models is contained in the A group, a current condition of the process tool is determined to be a normal condition. Otherwise, if the received process data is contained in the C group, a current condition of the process tool is determined to be an abnormal condition.

However, process data contained in an E area of FIG. 4 is not contained in the good model or the faulty model. Therefore, in this case, it is determined whether the process data contained in the E area is more similar to the good model or the faulty model. Although the process data contained in the E area is slightly spaced apart from the good model, it is largely spaced apart from the faulty model, such that it is determined to be more similar to the good model, and a process tool condition is therefore also determined to be equal to the normal condition. Otherwise, if the received process data is equally spaced apart from the good and faulty models, the determination of a tool condition in a current estimation process is postponed, such that the normal or abnormal condition of the process tool condition will be determined in the next estimation process.

In contrast to the aforementioned case, the comparison between the good model and the faulty model may be performed only when the received process data is in a predetermined range from the good model, such that similarity between the good model and the faulty model may be determined according to the result of the comparison. In more detail, if the process data of FIG. 4 is contained in the A group, it is determined that the process tool is in a normal condition. If the process data is spaced apart from an F group, it is determined that the process tool is in an abnormal condition. If the process data is contained between the A and F groups, it is determined whether the process data is more similar to the good or faulty models, such that a current condition of the process tool can be determined. In this case, the F group may be differently determined according to the process tools being used.

For example, process data contained in a G group is spaced apart from the F group, such that a current condition of the process tool is determined to be a faulty or abnormal condition irrespective of similarity to the good or faulty model. Process data contained in E and H groups determines a current condition of the process tool on the basis of similarity to the good or faulty model.

After completing the aforementioned estimation, the error detector 15 transmits the estimated result to a user interface 16. The user interface 16 indicates the estimation result in the form of an analysis report or analysis chart, such that a user can visually recognize the estimation result.

Figure 5A:
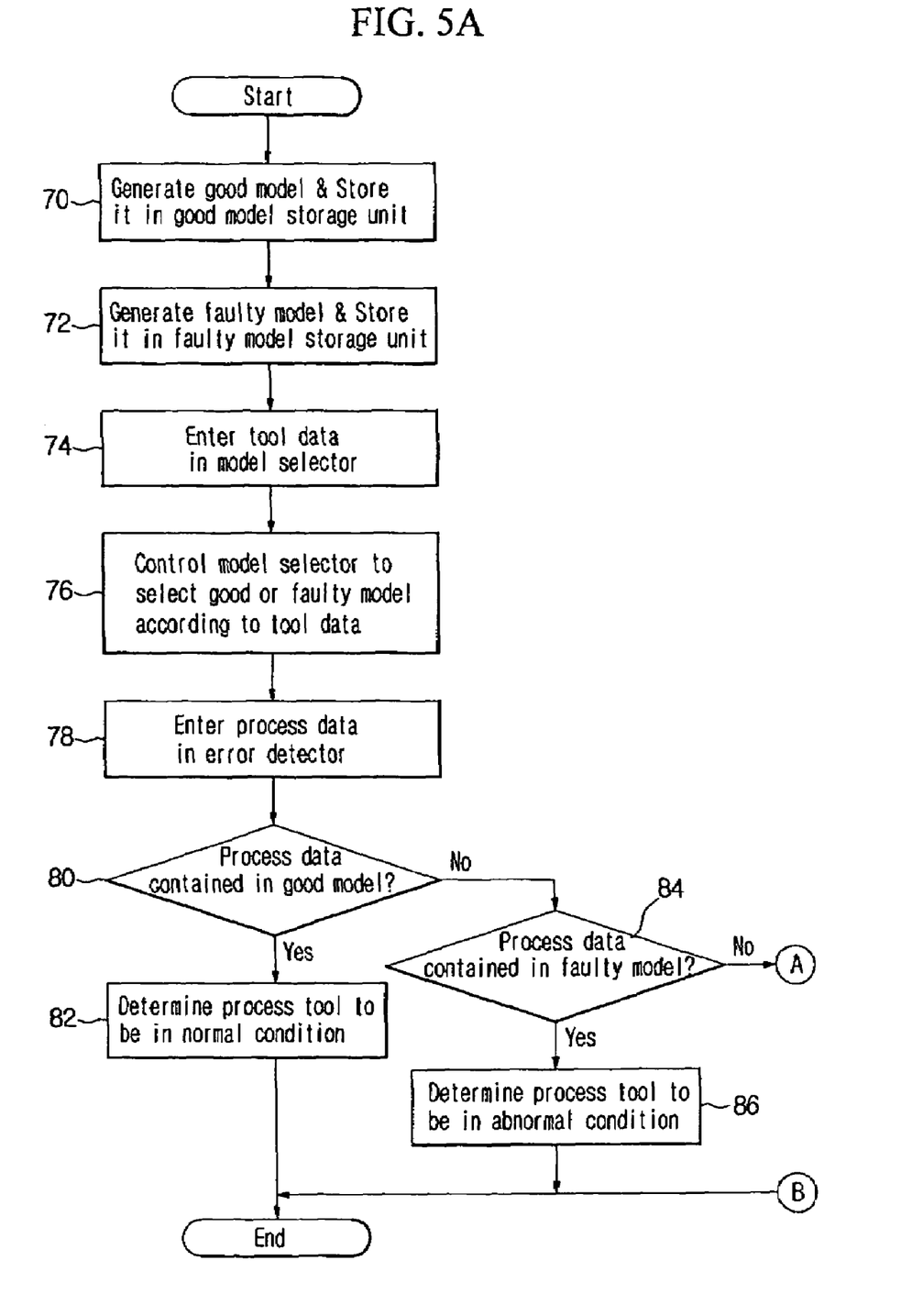
FIGS. 5A and 5B are flow charts illustrating operations of the monitoring system of FIG. 2, in accordance with an embodiment of the present general inventive concept.
Figure 5B:
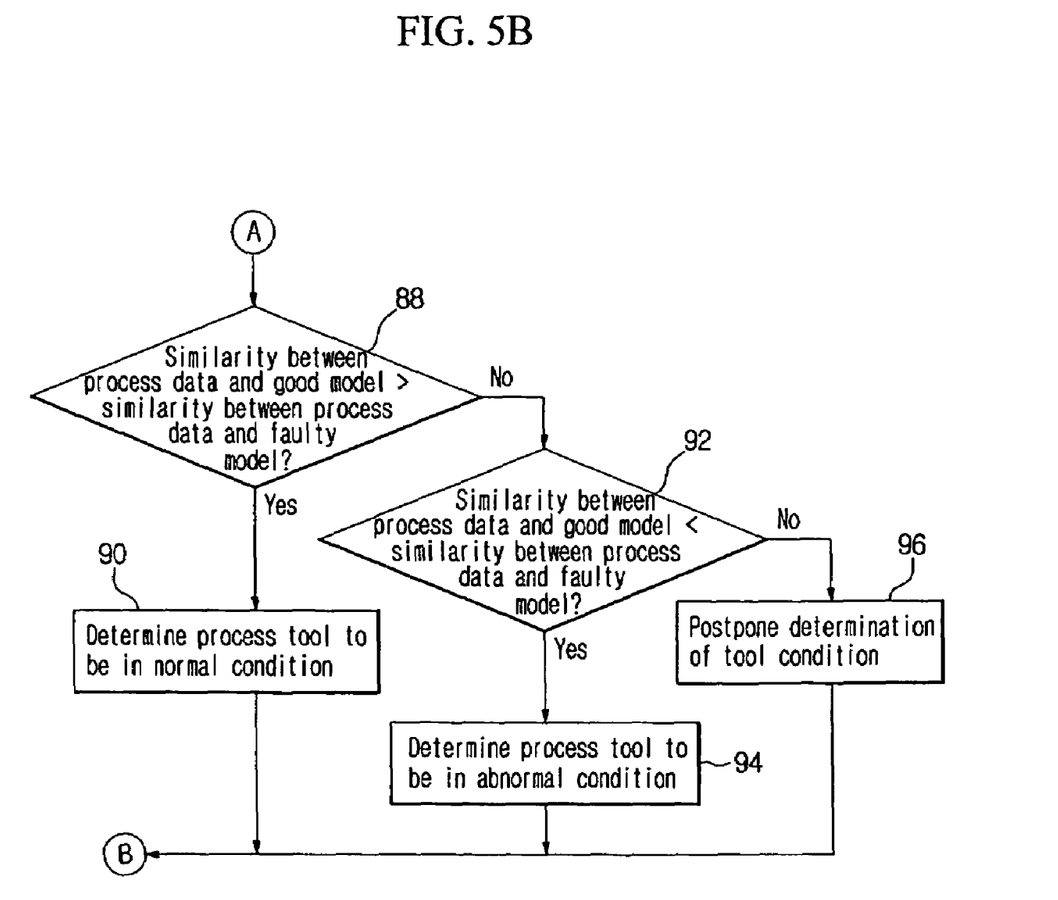

Operations of the monitoring system of FIG. 2 will hereinafter be described with reference to FIGS. 5A and 5B. Referring to FIGS. 5A and 5B, a user stores a plurality of good models for modeling good data stored in the reference DB 11 in the good model storage unit 12 at operation 70, and stores a plurality of faulty models to model faulty data stored in the reference DB 11 in the faulty model storage unit 13 at operation 72.

If the good models and the faulty models have been stored in the good model storage unit 12 and the faulty model storage unit 13, respectively, the model selector 14 receives tool data at operation 74. Then, the model selector 14 selects the most appropriate good and faulty models for the tool data, and transmits the selected good and faulty models to the error detector 15 at operation 76.

The error detector 15 receives the process data from the process control server 50 at operation 78, and determines whether the process data is contained in the good model using individual estimation methods contained in the good and faulty models at operation 80. If the process data is contained in the good model, the error detector 15 determines a current condition of the process tool to be a normal condition at operation 82. Otherwise, if the process data is not contained in the good model, the error detector 15 determines whether the process data is contained in the faulty model at operation 84.

If the process data is determined to be contained in the faulty model at operation 84, the error detector 15 determines a current condition of the process tool to be an abnormal condition at operation 86. Otherwise, if the process data is not contained in the faulty model at operation 84, the error detector 15 calculates similarity between the process data and each of the good and faulty models.

After calculating the similarity between the process data and each of the good and faulty models, the error detector 15 determines whether similarity between the process data and the good model is greater than the other similarity between the process data and the faulty model at operation 88. In this case, if the process data is more similar to the good model, the process tool is determined to be in a normal condition at operation 90. Otherwise, if the process data is not more similar to the good model than the faulty model, the error detector 15 determines whether similarity between the process data and the good model is less than the other similarity between the process data and the faulty model at operation 92.

If the process data is more similar to the faulty model, the process tool is determined to be in an abnormal condition at operation 94. However, if the similarity between the process data and the good model is not less than the other similarity between the process data and the faulty model, the determination of a current condition of the tool is postponed at operation 96.

After finishing the estimation of the process data, the error detector 15 may transmit the estimation result to the user interface 16, such that the user interface 16 may visually display the received estimation result. Particularly, if an unexpected error or faulty operation occurs in any process tool, the error detector 15 may generate an alarm signal or sound, or may also interrupt operations of the semiconductor fabrication line.

As apparent from the above description, the embodiments of the present general inventive concept provide a system to and method of monitoring a current condition of a process tool, which considers good and faulty models when estimating a current condition of the process tool, such that it can correctly determine the current condition of the process tool.

Therefore, the embodiments of the present general inventive concept largely reduce the possibility of mistaking a normal condition of the process tool for an abnormal condition of the same, such that it prevents efficiency of the process tool from being deteriorated by work interruption caused by a wrong alarm signal or sound.

Although various embodiments of the present general inventive concept have been shown and described, it will be appreciated by those skilled in the art that changes may be made to the embodiments without departing from the principles and spirit of the general inventive concept, the scope of which is defined in the claims and their equivalents.

What is claimed is:

1. A system to monitor a condition of a process tool, comprising:
 a first model storage unit to store one or more good models generated by data associated with the process tool;
 a second model storage unit to store one or more faulty models generated by the data associated with the process tool;
 a model selector to receive tool data from the process tool, and to select one of the good models and one of the faulty models in association with the received tool data; and
 an error detector to receive process data from the process tool, to compare the received process data with the good and faulty models selected by the model selector, and to estimate a condition of the process tool.

2. The system according to claim 1, wherein the one or more good models are generated by various good data indicative of a normal condition of the process tool, and the one or more faulty models are generated by various faulty data indicative of an abnormal condition of the process tool.

3. The system according to claim 2, wherein the good data and the faulty data are differently determined according to a variety of classification references.

4. The system according to claim 2, wherein the one or more good models are modeled by different modeling methods when there are two or more good models.

5. The system according to claim 2, wherein the one or more faulty models are modeled by different modeling methods when there are two or more faulty models.

6. The system according to claim 2, wherein the error detector determines whether the process data is contained in the good model and the faulty model, and determines whether the process data is similar to the good model and the faulty model, such that it determines a condition of the process tool according to the determined results.

7. The system according to claim 6, wherein the error detector determines the condition of the process tool to be a normal condition when the process data is contained in the good model or is more similar to the good model than the faulty model, or determines the condition of the process tool to be an abnormal condition when the process data is contained in the faulty model or is more similar to the faulty model than the good model.

8. The system according to claim 1, wherein the tool data includes a variety of information including a degree of obsolescence of the process tool, presence or absence of replacement of a component in the process tool, and presence or absence of a process change.

9. The system according to claim 1, further comprising:
 a reference database (DB) to store the good data and the faulty data.

10. The system according to claim 1, further comprising:
 a display to display the result of monitoring the condition of the process tool.

11. A system to monitor a condition of a process tool, comprising:

a first model storage unit to store at least one good model indicative of reference good data to determine a condition of the process tool;

a second model storage unit to store at least one faulty model indicative of reference faulty data to determine a condition of the process tool;

a model selector to receive tool data from the process tool, and to select the good model and the faulty model in association with the received tool data; and an error detector to receive process data from the process tool, to compare the received process data with the good and faulty models selected by the model selector, and to estimate a condition of the process tool.

12. A method of monitoring a condition of a process tool, comprising the operations of:

storing one or more good models generated by good data collected in a normal condition of a process tool and one or more faulty models generated by faulty data collected in an abnormal condition of the process tool;

selecting a good model and a faulty model in association with process tool data received from the process tool;

comparing the process data received from the process tool with the selected good model and the selected faulty model; and determining a condition of the process tool according to the result of the comparison.

13. The method according to claim 12, wherein the condition of the process tool is determined to be a normal or abnormal condition according to a result indicating whether the process data is contained in the good model and the faulty model and a similarity result indicating whether the process data is similar to the good model and the faulty model.

14. The method according to claim 13, wherein the similarity between the process data and the good model and the other similarity between the process data and the faulty model are weighted with different weights if the condition of the process tool is determined according to the similarity result, such that the similarity between the process data and the good model and the other similarity between the process data and the faulty model are calculated.

15. A method of monitoring conditions of plural process tools, comprising the operations of:

storing one or more good models generated by good process data collected in a normal condition of each process tool and one or more faulty models generated by faulty process data collected in an abnormal condition of each process tool;

selecting a good model and a faulty model in association with tool data received from each process tool; and determining a condition of the process tool based on a comparison between process data received from each process tool and both the selected good model and the selected faulty model.

16. The method of claim 15, further comprising determining whether the process data of each process tool is contained in the respective faulty model if the comparison does not determine that the process data of each process tool is in the respective good model.

17. The method of claim 16, further comprising:

calculating a similarity between the process data of each process tool and each of the respective good and faulty models if the process data of each process tool in determined not to be contained in the respective faulty model; and determining whether each process tool is in the normal condition or the abnormal condition by determining whether the similarity between the respective process data and the respective good model is greater than the similarity between the respective process data and the respective faulty model.

18. A system to monitor a condition of plural process tools, comprising:

a model storage unit to store one or more good models generated by data associated with each process tool and one or more faulty models generated by the data associated with each process tool;

a model selector to receive tool data from each process tool, and to select one of the good models and one of the faulty models in association with the received tool data for each process tool; and an error detector to receive process data from each process tool, to compare the received process data of each process tool with the respective good and faulty models selected by the model selector, and to estimate a condition of each process tool in accordance with the comparison.

19. The system according to claim 18, wherein:

the one or more good models are generated by various good data indicative of a normal condition of the process tool, and the one or more faulty models are generated by various faulty data indicative of an abnormal condition of the process tool; and the good data and the faulty data are differently determined according to a variety of classification references.

20. The system according to claim 18, wherein the error detector determines whether the process data is contained in the good model and the faulty model, and determines whether the process data is similar to the good model and the faulty model, such that the error detector determines a condition of the process tool according to the determined results.

* * * * *